March 10, 1970 M. R. LORD 3,499,994

MULTIPLEX TRANSMISSION SUPERVISORY SYSTEM USING A PRESELECTED SIGNALLING CHANNEL

Filed Jan. 12, 1967 3 Sheets-Sheet 1

3,499,994

MULTIPLEX TRANSMISSION SUPERVISORY SYSTEM USING A PRESELECTED SIGNALLING CHANNEL

Michael Robert Lord, Basildon, Essex, England, assignor to International Standard Electric Corporation, New York, N.Y.

Filed Jan. 12, 1967, Ser. No. 608,890
Claims priority, application Great Britain, Feb. 2, 1966, 4,572/66
Int. Cl. H04j 3/14
U.S. Cl. 179—15 8 Claims

ABSTRACT OF THE DISCLOSURE

In lieu of a pilot signal, a pulse code modulated tone is transmitted to a distant office over a selected PCM channel if the channel is idle. At the distant office, an alarm is given when the received demodulated tone is either absent or diminished below a certain value.

This invention relates to supervisory arrangements for time division multiplex telecommunication systems.

In telecommunication systems providing a plurality of channels between two locations some of the equipment at the terminals as well as all line and repeater equipment are common to all the channels. It is therefore important to provide reliable supervisory arrangements for checking this common equipment.

When the channels are established on a frequency division multiplex basis it is usual to transmit one or more pilot signals each having a specific frequency and to use the variation of amplitude of the pilot or pilots for various supervisory functions including the alarming of fault conditions.

In time division multiplex systems the transmission of a continuous pilot signal is not possible as the whole of the available bandwidth is used by each channel in turn. The pilot signal can of course be transmitted over a channel of the system, but this method is uneconomical.

It is an object of this invention to transmit a pilot signal over one of the communication channels only when that channel is in an idle condition, so that the traffic handling capacity of the system is not reduced.

According to the invention there is provided a supervisory system for a time division multiplex telecommunication system providing an equal number of two way signalling and information channels comprising two terminal stations each having a transmitter and a receiver in which stations A and B a pulse code modulated test tone is transmitted from the transmitters of each station to the receiver of the distant stations over a selected channel only during idle periods of that channel. An alarm condition is indicated when the amplitude of the received test tones at either of the stations is diminished by more than a predetermined amount.

Figure 1:
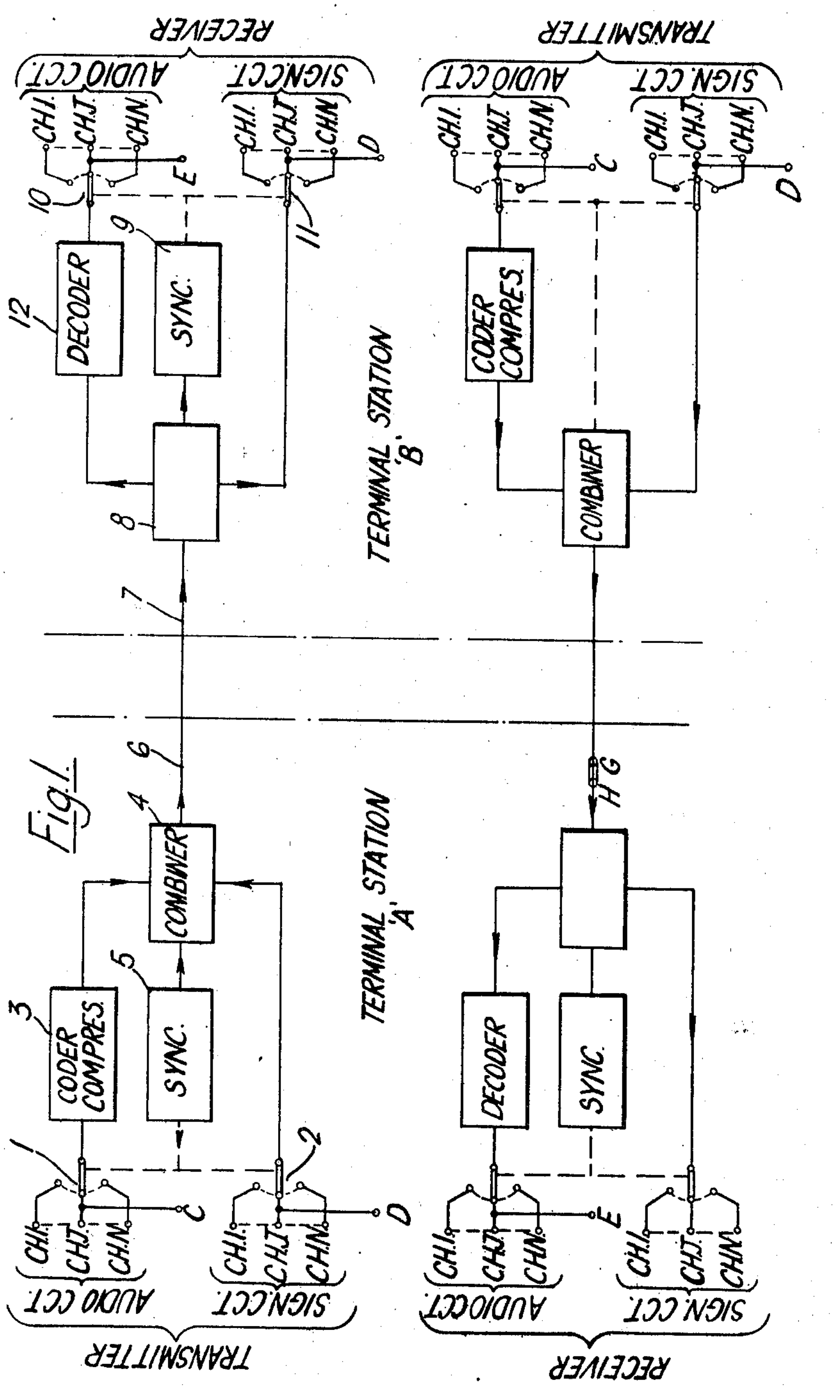

The invention as applied to a Pulse Code Modulated (P.C.M.) local area system in which a number of audio telephone circuits and an equal number of associated signalling circuits are transmitted over a 4-wire circuit will now be described with reference to the accompanying drawings in which FIG. 1 shows in block schematic form a P.C.M. local area system.

Figure 2:
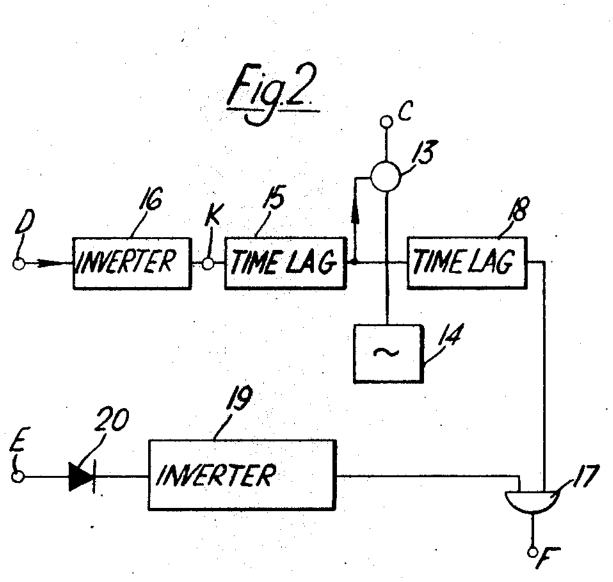
Figure 3:
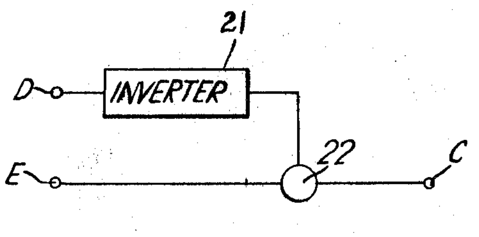
Figure 4:
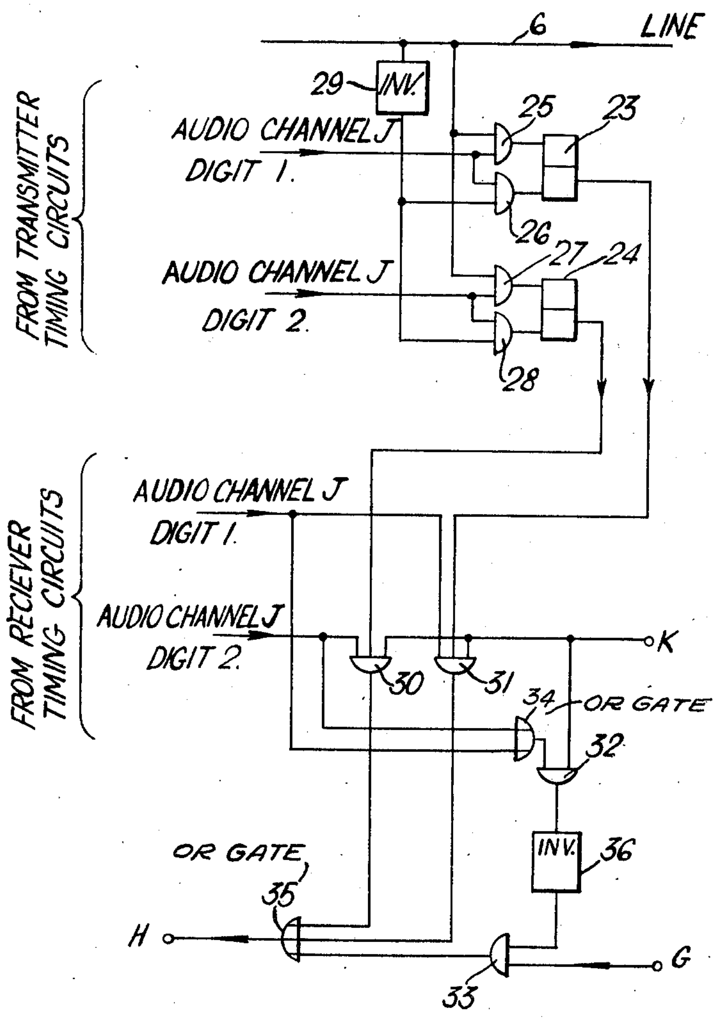

FIG. 2 shows a schematic of a supervisory system according to one embodiment of the invention, FIG. 3 shows another embodiment of the invention, and FIG. 4 a still further embodiment of the invention.

The essential parts of a local area P.C.M. system are shown in FIG. 1. It provides N two-way channels, each channel comprising an audio and a signalling circuit. At the transmitter of each terminal the N audio and N signalling circuits are shown connected to electronic channel selector switches 1 and 2 which for simplicity are shown as conventional selector switches. The audio signals are quantised, compressed and encoded by known P.C.M. methods. This equipment, which is common to all N channels is indicated by block 3. A further digit used for synchronising purposes and to indicate the signalling condition on a channel is added to the P.C.M. code in the combining unit 4. The synchronising digit is derived from the timing and synchronising unit 5 which also controls the operation of the channel selector switches 1 and 2. The complete P.C.M. signal is transmitted to line 6.

At the receiver of each terminal the coded signals are connected via conductor 7 to unit 8 where the digits of the code representing synchronising, signalling and audio information are separated. The synchronising digits are taken to the synchronising unit 9 which also controls the electronic channel selector switches 10 and 11. The signalling digits are taken to the selector 11 and the digits representative of the audio signal are taken to the decoder-expander unit 12 where they are converted back into analogue signals. The transmitter and receiver for operation in the opposite direction are identical to those described and are shown in the lower part of FIG. 1.

At each terminal station a supervisory logic circuit shown in block schematic form in FIG. 2 is used. The circuit comprises an electronic switch 13 by means of which an audio frequency signal from oscillator 14 can be connected to terminal C. The switch is controlled by a signal at terminal D. This signal is applied via inverter 16, that is a logic circuit which gives an output signal when there is no signal at its input, and no output signal when there is an input signal, to a time lag circuit 15 which passes signals only if their duration is greater than a specified minimum value.

An AND gate 17 obtains one of its input signals from a second time lag circuit 18 and another input from an inverter unit 19 and a rectifier 20. The terminals C, D and E of the circuit of FIG. 2 are connected to equally designated terminals shown in FIG. 1. Terminal F is connected to the station alarm, not shown.

The operation of the circuit will now be given and it will be assumed that the Jth channel is used for supervisory purposes. When this channel becomes idle the D.C. signal on terminal D of the signalling circuit at the transmitter of station A will vanish and a signal will therefore appear at the output of the inverter 16. The signal, provided its duration is in excess of the time lag of network 15 is applied to the control input of electronic switch 13. The purpose of time lag network is to prevent the actuation of the alarm circuit when dialling impulses are transmitted i.e. when the D.C. potential on the signalling circuit is interrupted for a nominal duration of 60 milliseconds for each digit of the dialling code. When the channel becomes idle, i.e. when the D.C. potential on terminal D vanishes for a period longer than say 100 ms., the output from the audio oscillator 14 will appear at terminal C and will be injected into the audio circuit of the Jth channel. This signal is converted into a P.C.M. code by the common equipment at the transmitter of terminal station A and is transmitted to the receiver of terminal station B where it is reconverted into the original audio signal and appears at terminal E of the audio circuit of channel J.

In normal operation when channel J becomes idle, the supervisory equipment at terminal station B will have a test tone at terminal E and no signal at terminal D. Therefore as already explained the test tone will appear at terminal C which will be injected into the audio circuit of the Jth channel for transmission from B to A. A test tone transmitted from station A will therefore appear at terminal E of station B, there will be no output from inverter 19 and gate 17 will remain closed. Similarly if at the output of the receiver at station A, a test tone appears at terminal E gate 17 will remain closed.

If the time lags of networks 15 at each station differ from one another it may occur that when a test tone is transmitted from station A to station B the test tone returned from B to A will be delayed by an interval equal to the difference of delays of the networks 15. This delay will be interpreted by the logic circuit as a fault condition and an alarm will be given. To overcome this difficulty an additional time lag network 18 is included in the alarm circuit.

If a fault condition occurs in the common equipment associated with transmission in the A to B direction the signal at terminal E of the receiver at station B will vanish with the result that a D.C. signal will appear at the output of inverter 19. This signal together with the signal at the output of network 18 will open gate 17 and will actuate the alarm circuit connected to terminal F. Similarly if a fault develops in the common equipment associated with transmission in the B to A direction the supervisory equipment at station A will give an alarm by opening AND gate 17 when no test tone is received at terminal A.

Transmission faults do not always result in a complete interruption of a signal, but may only reduce its amplitude. For this reason either the sensitivity of the AND gate 17 or the amplitude of the signals applied to it must be adjusted to operate the alarm when the transmission loss has increased to a value considered indicative of a fault condition.

A simplified supervisory equipment for one of the terminal stations is shown in FIG. 3. It differs from that described in that at the B station no test tone generator is provided. Instead the tone received from the A station is re-injected at the transmitter of the B station and is returned to A. In this arrangement in the event of a fault the alarm is given only at the A station. The circuit comprises only an inverter 21 and an electronic switch 22. When at station B a test tone is received on terminal E and the channel is idle, i.e. there is no potential at terminal D, this test tone will appear at terminal C and will be injected into the transmitter input of the Jth channel for transmission to the A station.

Sometimes the situation arises when a terminal station at one end of the system must co-operate with a second station of different manufacture, so that unless the supervisory arrangements at both stations are compatible, each station must be provided with independent supervisory equipment. This presents considerable difficulties because in a 4-wire P.C.M. system the "go" and "return" circuits are not synchronous with each other. For this reason it is impossible to extract directly from the transmitter, during idle periods of a channel, the P.C.M. code representative of the test tone and inject this code into the receiver, since the time slots for the transmitter and receiver are not coherent.

Alhough a self alarming terminal station will supervise the common equipment at that station, additional supervisory equipment will be required to alarm any fault in the line and repeater equipment. This additional circuitry is usually included in the synchronising equipment.

An arrangement which overcomes this difficulty is shown in FIG. 4. The circuit shown in that figure is additional to circuits shown in FIGS. 1 and 2 and is connected to them by terminals G, H and K.

The basic feature of the arrangement is to extract from the output going line 6 at least two digits of the code representative of the audio signal on channel J, and to store them in bistable units. This stored informaton is then gated by the synchronising signals at the receiver and is injected into the receive line during the time slots corresponding to the Jth channel.

To store the transmitted digits a logic circuit comprising bistable units 23, 24, AND gates 25, 26, 27, 28 and an inverter 29 is connected across outgoing P.C.M. line 6. This logic circuit is also receiving timing pulses from the transmitter timing circuits, not shown, corresponding to the time slots of two digits of the audio signal on channel J. It will be seen hat the bistable unit 23 will indicate by its setting whether or not there was a first audio digit in the code signal for channel J. Similarly bistable unit 24 will record whether or not the audio signal on channel J had a second digit.

The "insert" circuit for the receiver is shown in the lower part of FIG. 4. It comprises four AND gates 30, 31, 32, 33, OR gates 34, 35 and inverter 36. Terminals H and G of FIG. 4 are connected to the similarly referenced terminals on FIG. 1, after the strap joining them together has been removed.

The operation of the circuit will now be described. When channel J is busy there is no signal on terminal K, so that gate 32 is blocked with the result that a signal is applied from the output of inverter 36 to gate 33. Thus when a signal arrives from station B at terminal G, gate 33 opens and passes the signal via OR gate 35 to terminal H connected to the input of the receiver. During idle periods of channel J a signal appears on terminal K, so that during the time slots corresponding to the selected digits of the audio signal on channel J gate 32 opens with the result that the output of inverter 36 becomes zero, blocking gate 33 and disconnecting terminal G from H.

At the same time the signals stored in the bistable "store" units 23 and 24 are injected into the receiver via terminal H and OR gate 35 during the time slots corresponding to the selected audio digits of the code of channel J.

In the above description of the circuit of FIG. 4 only two digits of the P.C.M. code identifying the test tone were used. If the first of the two selected digits is the polarity digit and the second the most significant digit indicating the amplitude of the audio signal the P.C.M. signal injected into the receiver will be representative of a square wave provided the amplitude of the test tone applied to the input of channel J is large enough to excite the most significant digit.

The fact that the injected P.C.M. code after decoding in the receiver produces only an approximation to the original test tone is of the no consequence because the operation of the logic circuit of the alarm depends on the presence or absence of a signal and not on its shape. The logic circuit of FIG. 4 can be extended to transfer more or all the digits of the code of the audio signal from the transmit to the receive path instead of only two digits as shown, but for the reason stated no advantage would be obtained.

It is to be understood that the foregoing description of specific examples of the invention is made by way of example only and is not to be considered as a limitation on its scope.

I claim:

1. A supervisory system for a time division multiplex telecommunication system comprising means for providing an equal number of time division two way signalling and information channel, means including a transmission media interconnecting two terminal stations for conveying signals sent via said channels, each of said stations having a transmitter and a receiver, means for transmitting a test tone from a transmitter of one terminal station to a receiver of another terminal station over a selected information channel during periods while that channel is idle, and means for giving an alarm condition when the amplitude of the received test tone is diminished by more than a predetermined amount.

2. The system of claim 1 in which first inverter means are provided at the transmitter of each of said one terminal stations to monitor the signalling and to detect the idle condition on the selected channel, means at said one terminal station operated responsive to the detection of said idle condition for injecting a pulse modulated test tone into the selected information channel, means at the receiver of said another terminal station for demodulating the received pulse code modulated test tone, second inverter means coupled to said demodulating means for providing a signal responsive to said demodulated signal below a certain level, and means responsive to both the said second inverter signal and the signal derived from said first inverter means at said another station for providing a signal for giving said alarm.

3. The system of claim 2 in which said first inverter means include time lag means for inhibiting the transmission of the test tone when the duration of the idle condition is shorter than a predetermined time interval.

4. The system of claim 3 in which said time lag means comprises a delay circuit having a time lag greater than said predetermined time interval.

5. The system of claim 4 in which logical switching means are provided at the receiver of said another terminal station to extract the test tone received over the selected channel and to inject it into the transmitter of that said another terminal station for transmission to said one terminal station.

6. The system of claim 4 and means for transmitting time division multiplex code signals in one direction which are not synchronized with the time division multiplexing code signals used for transmission in the opposite direction.

7. The system of claim 6 and means for encoding said test tone as a PCM word, all digits of the code representative of the test tone being applied to the input of the transmitter at a station, means for storing said PCM word in binary form, and means for transferring said word from said store to the input of the receiver at that terminal in the time slots corresponding to the selected channel and the appropriate direction of transmission.

8. The system of claim 7 in which the store comprises one bistable unit for each digit of said stored PCM word.

References Cited

UNITED STATES PATENTS

| | | | |
|---|---|---|---|
| 3,144,514 | 8/1964 | Gitter | 179—15 |
| 3,201,777 | 8/1965 | Brown | 179—15 |
| 3,259,695 | 7/1966 | Murakami | 179—15 |

WILLIAM C. COOPER, Primary Examiner

ALBERT B. KIMBALL, Jr., Assistant Examiner

U.S. Cl. X.R.

179—175.2